United States Patent [19]

Smith

[11] 4,029,027

[45] June 14, 1977

[54] METHOD FOR GENERATING HEAT

[75] Inventor: Robert H. Smith, Plano, Tex.

[73] Assignee: Atlantic Richfield Company, Los Angeles, Calif.

[22] Filed: Oct. 20, 1975

[21] Appl. No.: 623,614

[52] U.S. Cl. .................................. 110/28 J; 431/9
[51] Int. Cl.² .......................................... F23B 7/00
[58] Field of Search ................ 110/28 J; 431/2, 3, 431/9, 11, 115, 116

[56] References Cited

UNITED STATES PATENTS

| | | | |
|---|---|---|---|
| 1,969,501 | 8/1934 | Chapman | 110/28 J |
| 1,984,441 | 12/1934 | Stratton | 110/28 J |
| 2,741,549 | 4/1956 | Russell | 110/28 J X |
| 3,805,713 | 4/1974 | Notary et al. | 110/28 J X |

FOREIGN PATENTS OR APPLICATIONS

| | | | |
|---|---|---|---|
| 858,462 | 1/1961 | United Kingdom | 110/28 J |
| 771 | 2/1896 | United Kingdom | 110/28 J |
| 317,470 | 8/1928 | United Kingdom | 110/28 J |

*Primary Examiner*—Alan Cohan
*Assistant Examiner*—Gerald A. Michalsky
*Attorney, Agent, or Firm*—Roderick W. MacDonald

[57] ABSTRACT

A method for generating heat from retorted oil shale particles which are carrying a deposit of carbon wherein the particles are lifted upwardly in a heating chamber using a carrier gas and the carrier gas is controlled in relation to the particles so that at any given time during the lifting step a substantial amount of the particles fall downwardly for a finite distance thereby causing internal backmixing of the heated falling particles with relatively cooler rising particles.

9 Claims, 1 Drawing Figure

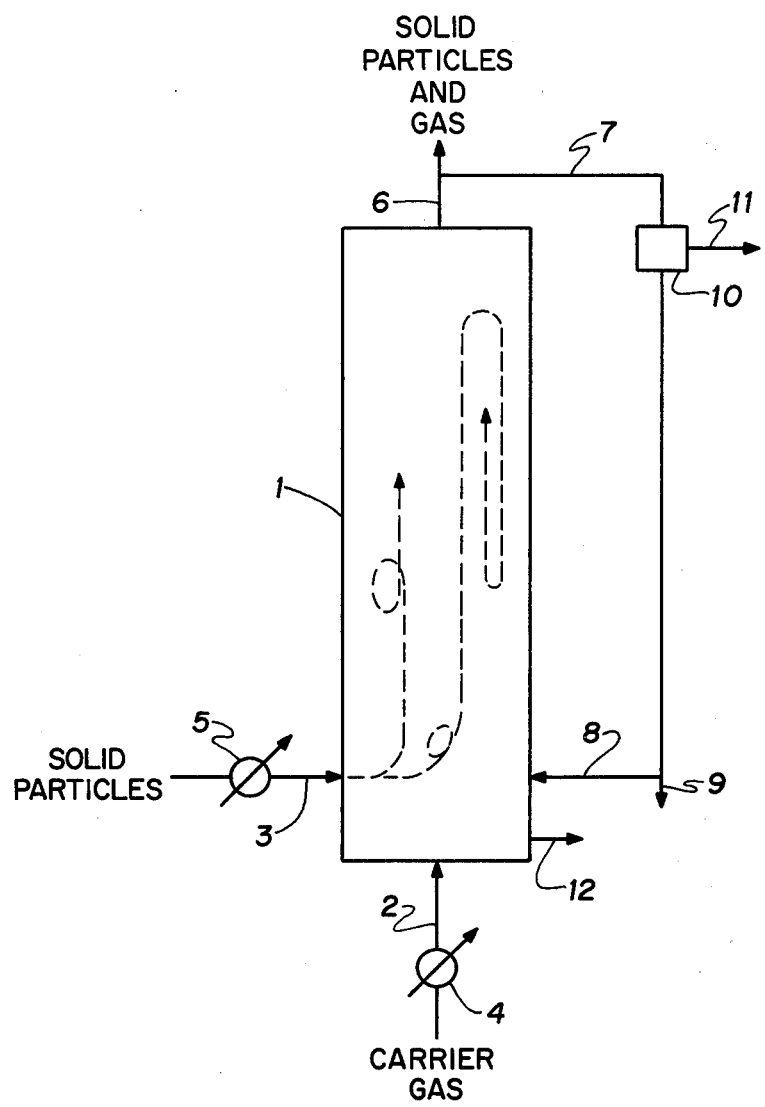

METHOD FOR GENERATING HEAT

BACKGROUND OF THE INVENTION

Heretofore a number of processes have been developed for retorting oil shale to recover therefrom a synthetic crude oil and/or a more refined oil product depending upon the setup of the particular plant.

It has been found that the shale oil particles, after retorting and separation from the oil product, carry to a greater or lessor extent a deposit of carbon, the carbon being on the surface of the particles and/or in the interior of holes, depressions and the like in the particles themselves.

SUMMARY OF THE INVENTION

According to this invention, a method is provided for generating heat from oil shale particles which carry a deposit of carbon thereby providing an additional source of energy for use in the oil shale retorting plant or any other desired use. Such energy would otherwise be lost because retorted oil shale particles are normally disposed of such as by deposition in a suitable location followed by compaction to prevent leaching by surface liquids and resodding with grass and the like so that such particles again become part of the earth.

In accordance with this invention, an upstanding heating chamber is provided in which the carbon carrying particles are heated to a temperature which causes combustion of the carbon. The carbon carrying particles are lifted from a lower portion to an upper portion of the heating chamber using a carrier gas. The quantity of solid particles being lifted by a given volume of gas is controlled to be sufficiently large so that a particle entering the chamber and being lifted therethrough does not necessarily only travel upwardly during its residence time in the chamber. Rather, at varying times and varying locations over the length of travel of the particle in the chamber the particle may fall downwardly one or more times for a finite distance before it ultimately rises to the upper outlet of the chamber. This random downward falling of various particles throughout the chamber is internal backmixing and is quite advantageous in this particular process because as a particle rises higher in the chamber it becomes hotter so that the falling particles are heated to a greater extent than the relatively lower and rising particles that are below the falling particles. This way the hot falling particles mix with relatively cooler rising particles thereby heating these relatively cooler rising particles and providing a much more efficient process for burning the carbon on the particles.

Accordingly, it is an object of this invention to provide a new and improved method for generating heat from oil shale particles that carry a deposit of carbon. It is another object to provide a new and improved method of generating additional energy for use in an oil shale plant and the like. It is another object to provide a new and improved method for heating particles in a lifting heating chamber.

Other aspects, objects and advantages of this invention will be apparent to those skilled in the art from this disclosure and the appended claims.

DETAILED DESCRIPTION OF THE INVENTION

The drawing shows a heating chamber useful in the method of this invention.

More specifically, the drawing shows an upstanding elongate heating chamber 1 into a lower portion of which is introduced a carrier gas by way of pipe 2 and solid particles to be heated by way of pipe 3. The solid particles and/or carrier gas can be at any desired temperature but are preferably preheated, and if not preheated at all or to the desired extent can undergo additional heating as desired by use of heaters 4 and 5.

The outlet from heating chamber 1 for both particles and gas is provided by pipe 6. If desired, at least a portion of the already combusted and therefore hot particles, can be externally recycled by way of pipe 7 for reintroduction to a lower portion of chamber 1 as shown by pipe 8. Provision should be made as shown by pipe 9 for removing part or all of the recycle stream from pipe 8 so that the extent of external recycle can be controlled or eliminated if desired. A solid-gas separation device 10 may be provided so that gas can be removed by pipe 11 from the particles to be recycled thereby externally recycling primarily only heated particles. The control of the carrier gas being injected by way of pipe 2 is important in order to obtain the internal backmixing desired for this invention. It may also be desirable in order to achieve the internal backmixing results of this invention to be able to remove a particle-gas stream from an intermediate portion of the chamber as shown by pipe 12.

The use of external recycle by way of pipe 8, intermediate solids and gas removal by way of pipe 12, gas removal by way of device 10, and apportionment of solids between pipes 8 and 9 can all be carried out at the same time or alone or in any combination of two or more thereof as is desirable to achieve combustion of the carbon on the particles in chamber 1 while utilizing internal backmixing.

The particular conditions which will allow internal backmixing as desired by this invention vary widely depending upon the type of heating chamber employed, the type of carrier gas employed, the type and size range of the solid particles to be treated, and the like, so that a precise set of conditions for all oil shale particles is extremely difficult if not impossible to set out quantitatively. However, the carrier gas and solid particle introduction into chamber 1 must be controlled in a manner which will be disclosed in greater detail hereinafter so that as the various particles travel upwardly in chamber 1 towards outlet 6 a substantial portion undergo at various times and in various locations between introduction at pipe 5 and outlet 6 one or more backmixing conditions in which the particle falls downwardly a finite distance and then resumes its upward travel, ultimately reaching outlet 6. There can be a buildup of larger solid particles, e.g., larger than about 4 mesh, in the bottom of chamber 1. This buildup of particles will be fluidized and can be controlled by being withdrawn, in whole or in part, by way of pipe 12. However, at any given time and location over the interior length of chamber 1 there can be one or more particles traveling downward at the same time a number of particles are traveling upward thereby causing substantial backmixing of relatively hotter downwardly moving particles with relatively cooler upward moving particles. This provides much better and uniform heating throughout the chamber and accomplishes more complete combustion of the carbon on the particles before they reach outlet 6. Generally, the particles should be predominantly less than 4 mesh (U.S. Sieve Size). It is not required that all particles be less than 4 mesh just that the substantial majority meet this requirement, for example, at least about 80 percent of the particles. It is also preferable that the carrier gas be controlled in relation to the solid particles so that the amount of particles falling downwardly for backmixing in said chamber at any given time is equivalent to at least about one-third by weight of the particles being fed into the chamber by way of pipe 3. The carrier gas can be air, oxygen, mixtures of two or mores gases, and the like, and can carry one or more oxidizing agents for enrichment. Generally, the carrier gas is introduced into the heating chamber by way of pipe 2 at a rate of at least 5 feet per second and at a ratio of pounds of particles being fed into the chamber by way of pipe 3 to cubic feet of gas being fed into the chamber by way of pipe 2 of at least about 1/1 but less than about 100/1. When there is external recycling of solid particles by way of pipe 8 the carrier gas introduction by way of pipe 2 should be at least 10 feet per second and the pounds of particles to cubic feet of carrier gas introduced ratio should be from about 2/1 to about 20/1. With external recycle of particles the predominant particle size can be reduced to less than 60 mesh.

EXAMPLE

Colorado oil shale having previously been retorted at a temperature in the range of 800° to 1,000° F and being in the size range of from about 4 mesh to less than 320 mesh is passed into a heating chamber substantially as shown in the drawing. Air is introduced into the bottom of the chamber by way of pipe 2 at a rate of 15 feet per second and is carefully controlled so that the pounds of oil shale particles introduced by way of pipes 3 and 8 to cubic feet of air introduced by way of pipe 2 is about 10 to 1, the solid particles being preheated to at least 1,100° F before entry into the heating chamber. Substantial heat is recovered from chamber 1 for use in heating water for heat exchange purposes.

Reasonable variations and modifications are possible within the scope of this disclosure without departing from the spirit and scope of this invention.

The embodiments of the invention in which an exclusive property or privilege is claimed are defined as follows:

1. A method for generating heat from oil shale particles that carry a deposit of carbon, comprising providing an upstanding heating chamber, heating said particles in said chamber to cause combustion of said carbon, lifting said particles during said heating from a lower portion to an upper portion of said chamber using a carrier gas and removing a substantial majority of said particles from said upper portion of said chamber, controlling said carrier gas so that at any given time during said lifting step a substantial amount of said particles fall downwardly for a finite distance thereby causing internal backmixing of heated falling particles with relatively cooler rising particles, said backmixing taking place at varying locations over essentially the full length of said chamber between said lower and upper portions, said carrier gas being introduced into said chamber at a rate of at least 10 feet per second at a pounds of particles/cubic foot of carrier gas ratio of from about 2/1 to about 20/1, and said particles being predominantly less than 60 mesh.

2. The method of claim 1 wherein said carrier gas is controlled so that the amount of particles falling downwardly in said chamber at any given time is equivalent to at least about ⅓ by weight of the particles being fed into said chamber to undergo combustion therein.

3. The method of claim 1 wherein a portion of said particles after treatment in said chamber are returned by external means for retreatment in said chamber.

4. The method of claim 3 wherein said carrier gas is air.

5. The method of claim 1 wherein a part of the heated particles leaving said chamber after undergoing combustion therein are returned to at least one point in the lower areas of said chamber to supply heat to the interior of said chamber.

6. The method of claim 1 wherein at least one of said particles and carrier gas are preheated before entering said chamber.

7. The method of claim 1 wherein said carrier gas is enriched with oxygen.

8. The method of claim 1 wherein said carrier gas is essentially oxygen.

9. The method of claim 1 wherein said chamber is artificially heated until combustion of said particles becomes self-sustaining after which said artificial heating is terminated.

* * * * *